(12) United States Patent
Cierniak et al.

(10) Patent No.: US 8,291,014 B2
(45) Date of Patent: *Oct. 16, 2012

(54) USER INTERFACE FOR WEB COMMENTS

(75) Inventors: Michal Cierniak, Palo Alto, CA (US);
Donn Denman, Los Gatos, CA (US);
Tony Hsieh, Cupertino, CA (US); Yuri Dolgov, St. Petersburg (RU); Andrey Adaikin, St. Petersburg (RU); Derek Prothro, San Mateo, CA (US); Marc Pawliger, San Jose, CA (US); Kansinee Adsanatham, San Francisco, CA (US); Ario Jafarzadeh, San Francisco, CA (US); Vladislav Kaznacheev, St. Petersburg (RU); Dmitry Barashev, St. Petersburg (RU)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/250,961

(22) Filed: Sep. 30, 2011

(65) Prior Publication Data

US 2012/0023392 A1 Jan. 26, 2012

Related U.S. Application Data

(63) Continuation of application No. 13/056,817, filed as application No. PCT/RU2009/000398 on Aug. 12, 2009.

(51) Int. Cl.
*G06F 15/16* (2006.01)

(52) U.S. Cl. ......... 709/203; 709/219; 715/205; 715/234

(58) Field of Classification Search .................. 709/203, 709/217–219; 715/233, 205, 234
See application file for complete search history.

(56) References Cited

U.S. PATENT DOCUMENTS

| 7,433,832 | B1 | 10/2008 | Bezos et al. | |
|---|---|---|---|---|
| 7,617,130 | B2 * | 11/2009 | Bezos et al. | 705/27.1 |
| 2004/0255232 | A1 | 12/2004 | Hammond et al. | |
| 2008/0021880 | A1 * | 1/2008 | Ren et al. | 707/3 |
| 2008/0209361 | A1 * | 8/2008 | Nickerson et al. | 715/808 |
| 2008/0215589 | A1 * | 9/2008 | Elhaik | 707/10 |
| 2009/0083383 | A1 * | 3/2009 | Piper et al. | 709/206 |
| 2009/0187818 | A1 * | 7/2009 | Compton et al. | 715/234 |
| 2009/0199103 | A1 * | 8/2009 | Brantley et al. | 715/733 |
| 2009/0276455 | A1 * | 11/2009 | Yu et al. | 707/102 |
| 2010/0241968 | A1 * | 9/2010 | Tarara et al. | 709/203 |
| 2011/0161413 | A1 * | 6/2011 | Cierniak et al. | 709/203 |

OTHER PUBLICATIONS

International Search Report dated Mar. 5, 2010, 3 pages.

* cited by examiner

*Primary Examiner* — Philip B Tran
(74) *Attorney, Agent, or Firm* — Harrity & Harrity, LLP

(57) ABSTRACT

One or more server devices receive a request associated with a link, where the link is further associated with a comment and where the comment provides an opinion of, or remarks upon, a content of a document. The one or more server devices retrieve a content of the comment associated with the link from a database and retrieve the document. The one or more server devices generate another document that displays the content of the comment and includes a frame that further displays the document, and send the generated another document to the client device.

20 Claims, 12 Drawing Sheets

USER INTERFACE FOR WEB COMMENTS

RELATED APPLICATIONS

This application is a continuation of U.S. application Ser. No. 13/056,817, filed Jan. 31, 2011 which is a national phase entry of PCT/RU2009/000398, filed Aug. 12, 2009, the disclosures of which are incorporated herein by reference.

BACKGROUND

Many techniques are available to users today to find information on the world wide web ("web"). For example, users often use web browsers and/or search engines to find information of interest.

A user may enter a search query into a search box of a browser and the browser may submit the search query to a search engine. The search engine may identify documents that match the search query, rank the documents based on various factors, and return a ranked list of document to the user. The user may select a document from the list and request the document. A browser may retrieve the requested document and display the document to the user in a browser window.

However, the amount of available information that is available to users on the web can be overwhelming.

SUMMARY

According to one implementation, a method performed by a client device may include presenting a document to a user at the client device and receiving, at a processor associated with the client device, a comment associated with the document, where the comment provides an opinion of, or remarks upon, a content of the document. The method may further include sending, by a processor associated with the client device, information associated with the comment to a server across a network and receiving, at a processor associated with the client device, a link associated with the comment from the server. The method may also include sharing the comment with one or more other client devices using the received link.

According to another implementation, a client device may include a display device and a network interface connected to an external network. The client device may further include one or more processors to: present a document to a user via the display device; receive a comment associated with the document, where the comment provides an opinion of, or remarks upon, a content of the document; send, via the network interface, information associated with the comment to a server across the external network; receive, via the network interface, a link associated with the comment from the server responsive to sending the information associated with the comment to the server; and share, via the network interface, the comment with other client devices using the received link.

According to an additional implementation, a computer-readable medium containing instructions executable by at least one processor may include one or more instructions for presenting a document, and one or more instructions for receiving a comment associated with the document, where the comment provides an opinion of, or remarks upon, a content of the document. The computer-readable medium may further include one or more instructions for sending information associated with the comment to a server across a network, and one or more instructions for receiving a link associated with the comment from the server. The computer-readable medium may also include one or more instructions for sharing the comment with other client devices using the received link.

According to yet another implementation, a method performed by one or more server devices may include receiving, from a client device by a processor associated with the one or more server devices, a request associated with a link, where the link is further associated with a comment and where the comment provides an opinion of, or remarks upon, a content of a document. The method may further include retrieving, by a processor associated with the one or more server devices, a content of the comment associated with the link from a database and retrieving, by a processor associated with the one or more server devices, the document. The method may also include generating, by a processor associated with the one or more server devices, another document that displays the content of the comment and includes a frame that further displays the document; and sending the generated another document to the client device.

According to an additional implementation, a server device may include a communication interface and a memory. The server device may further include one or more processors to: receive, from a client device via the communication interface, a request associated with a link, where the link is further associated with a comment and where the comment provides an opinion of, or remarks upon, a content of a document; retrieve content of the comment associated with the link from a database; retrieve the document; generate another document that displays the content of the comment and includes a frame that further displays the document; and send the generated another document to the client device via the communication interface.

According to a further implementation, a computer-readable medium containing instructions executable by at least one processor, includes one or more instructions for receiving a request associated with a link, where the link is further associated with a comment, where the comment provides an opinion of, or remarks upon, a content of a document, and where the link comprises a uniform resource locator (URL). The computer-readable medium may further include one or more instructions for retrieving a content of the comment associated with the link from a database and one or more instructions for retrieving the document. The computer-readable medium may also include one or more instructions for generating another document that displays the content of the comment and includes a Hypertext Markup Language (HTML) iframe that further displays the document; and one or more instructions for sending the generated another document to the client device.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements.

Overview

For some documents, users might like to see users' comments regarding these documents. A "comment," as used herein, may include text, audio data, video data, and/or image data that provides an opinion of, or otherwise remarks upon, the contents of a document or a portion of a document. One example of a comment may include a document whose sole purpose is to contain the opinion/remark. Another example of a comment may include a blog post. Yet another example of a comment may include a web page or a news article that remarks upon an item (e.g., a product, a service, a company, a web site, a person, a geographic location, or something else that can be remarked upon).

A "document," as the term is used herein, is to be broadly interpreted to include any machine-readable and machine-storable work product. A document may include, for example, an e-mail, a web site, a file, a combination of files, one or more files with embedded links to other files, a news group posting, a news article, a blog, a business listing, an electronic version of printed text, a web advertisement, etc. In the context of the Internet, a common document is a web page. Documents often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document.

Figure 1:
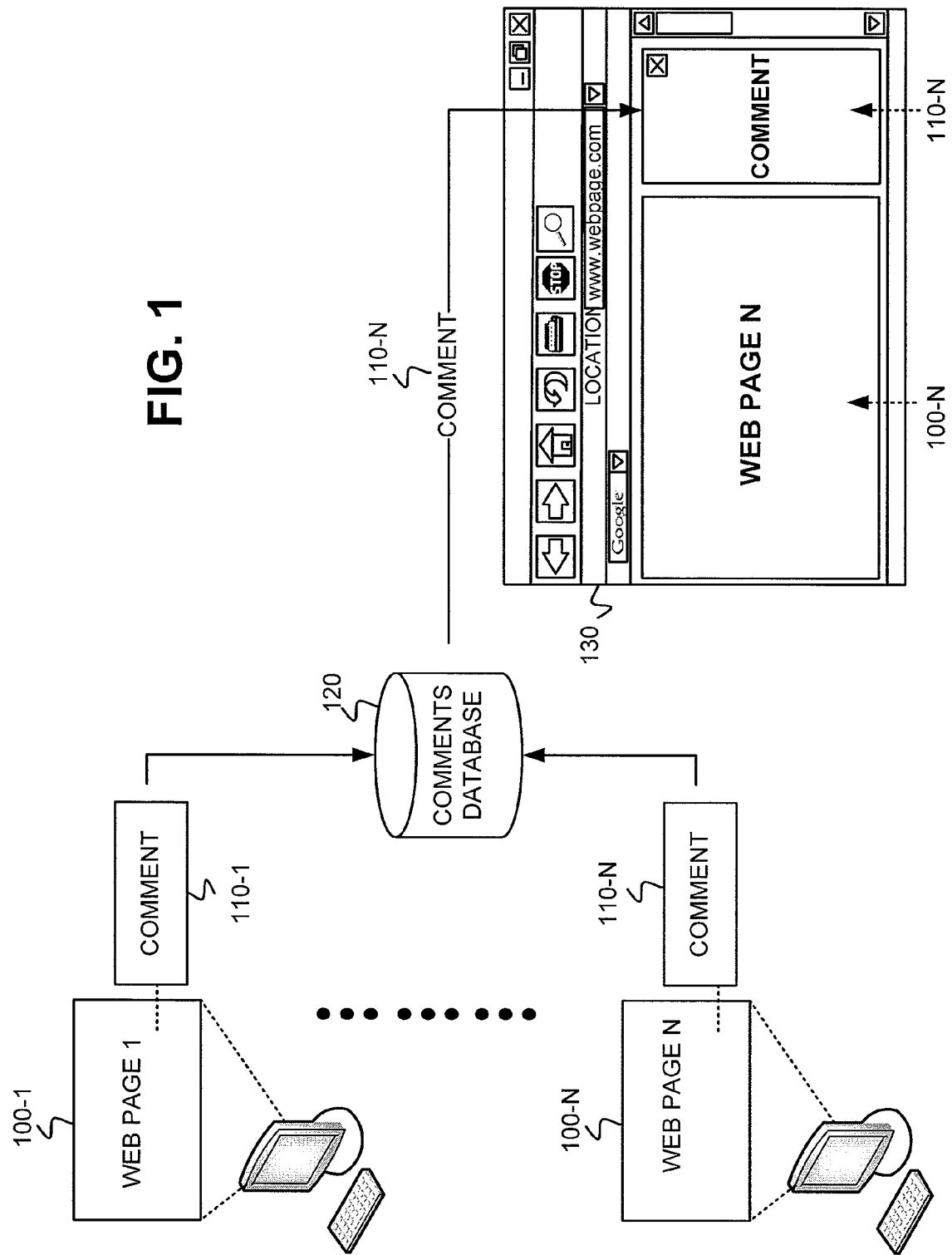
FIG. 1 is a diagram illustrating an overview of an exemplary implementation described herein.

FIG. 1 is a diagram illustrating an overview of an exemplary implementation described herein. As shown in FIG. 1, assume that a user (not shown) requests access to a web page 100-1 about a particular topic (shown as "web page 1" in FIG. 1). The user may decide to provide a comment 110-1 regarding the web page. In this case, the user may activate a commenting function to provide the comment 110-1. The user may then provide an opinion or remark for the comment 110-1.

As further shown in FIG. 1, assume that a user requests access to a web page 100-N about another particular topic (shown as "web page N" in FIG. 1). The user may decide to provide a comment 110-N regarding the web page. In this case, the user may activate a commenting function to provide the comment 110-N. The user may then provide an opinion or remark for the comment 110-N.

As also shown in FIG. 1, comments 110-1 through 110-N may be stored in a comments database 120 in association with the web page (or in association with an identifier for the web page).

Subsequently, a user may access a web page (e.g., web page N 100-N shown in FIG. 1) via a user interface 130. A corresponding comment (e.g., comment 110-N) may be retrieved from comments database 120 and displayed in user interface 130 in conjunction with the accessed web page. In one exemplary implementation, the comment may be displayed in a window generated by a toolbar, add-on or extension integrated into user interface 130. In another implementation, where the toolbar, add-on or extension may not be integrated into user interface 130, a document may be generated by a server (not shown) that displays comment 110-N and further includes a frame (e.g., a Hypertext Markup Language (HTML) iframe) that displays web page 100-N, and the server may further provide the generated document to user interface 130.

Exemplary Environment

Figure 2:
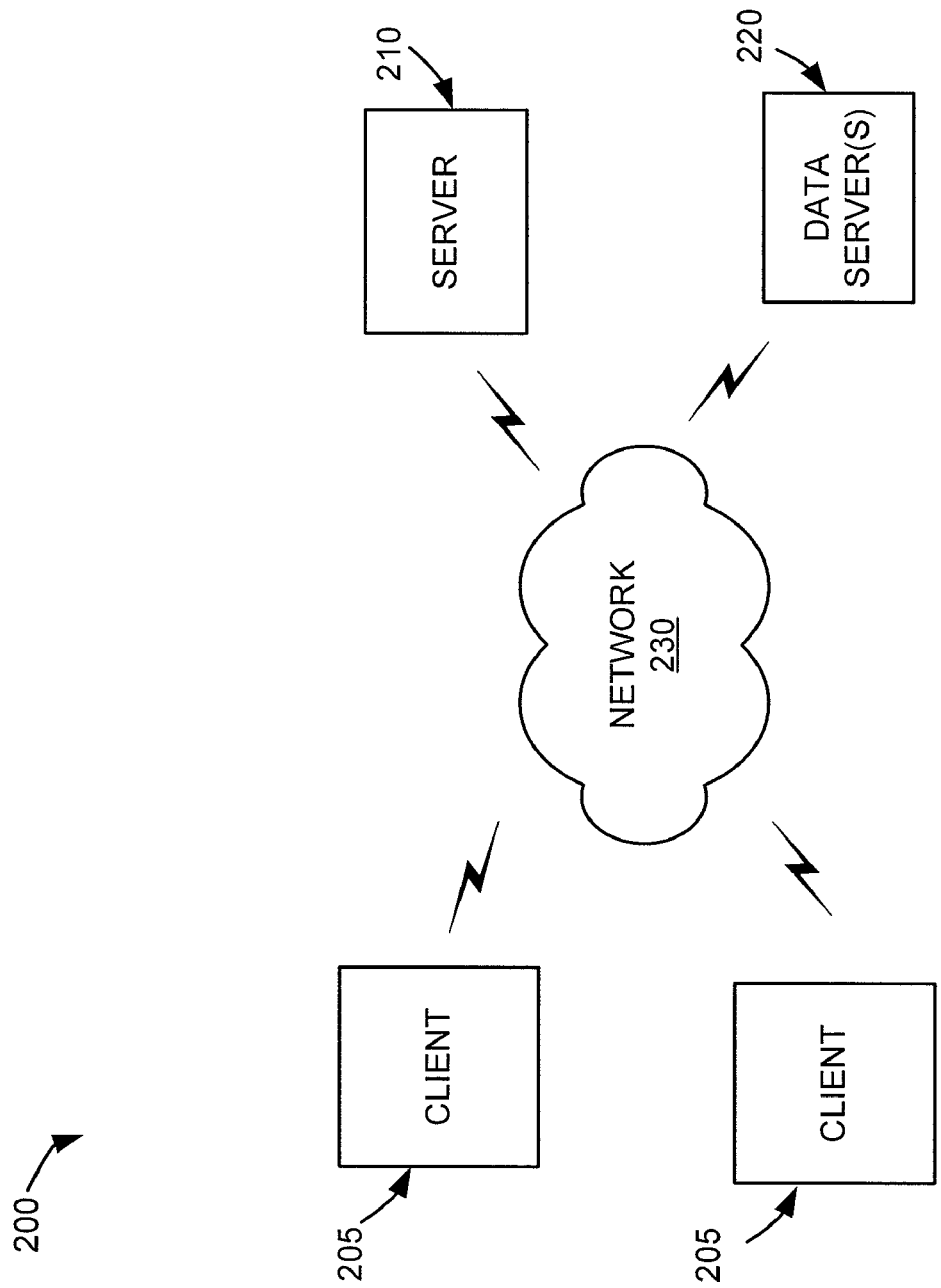
FIG. 2 is a diagram of an exemplary environment in which systems and methods described herein may be implemented.

FIG. 2 is a diagram of an exemplary environment 200 in which systems and methods described herein may be implemented. Environment 200 may include multiple clients 205 connected to multiple servers 210 and 220 via a network 230. Two clients 205 and two servers (e.g., server 210 and data server(s) 220) have been illustrated as connected to network 230 for simplicity. In practice, there may be more or fewer clients and servers. Also, in some instances, a client may perform a function of a server and a server may perform a function of a client.

Clients 205 may include client entities. An entity may be defined as a device, such as a personal computer, a wireless telephone, a personal digital assistant (PDA), a lap top, or another type of computation or communication device, a thread or process running on one of these devices, and/or an object executed by one of these devices. In one implementation, a client 205 may include a user interface (e.g., a browser application) that permits documents to be searched and/or accessed. Client 205 may also include software, such as a plug-in, an applet, a dynamic link library (DLL), or another executable object or process, that may operate in conjunction with (or be integrated into) the user interface to obtain and display comments. Client 205 may obtain the software from search server 210 or from a third party, such as a third party server, disk, tape, network, CD-ROM, etc. Alternatively, the software may be pre-installed on client 205.

In one implementation, as described herein, the browser may provide a commenting function. The commenting function may permit a user to generate a comment regarding a document, permit the user to view a comment that was previously generated by the user or by other users, and/or permit the user to remove a comment from presentation via the browser (e.g., hide the comment from view).

Server 210 may include a server entity that gathers, processes, searches, and/or maintains documents in a manner described herein. In one implementation, server 210 may gather, process, and/or maintain comments that are associated with particular documents. Server 210 may implement a data aggregation service by crawling a corpus of documents (e.g., web pages) hosted on data server(s) 220, indexing the documents to create a search index, and storing information associated with these documents in a repository of crawled documents. The aggregation service may be implemented in other ways, such as by agreement with the operator(s) of data server(s) 220 to distribute their documents via the data aggregation service.

Data server(s) 220 may store or maintain documents that may be browsed by clients 205, or may be crawled by server 210. Such documents may include data related to published news stories, products, images, user groups, geographic areas, or any other type of data. For example, data server(s)

220 may store or maintain news stories from any type of news source, such as, for example, the Washington Post, the New York Times, Time magazine, or Newsweek. As another example, data server(s) 220 may store or maintain data related to specific products, such as product data provided by one or more product manufacturers. As yet another example, data server(s) 220 may store or maintain data related to other types of documents, such as pages of web sites (e.g., web content).

While servers 210 and 220 are shown as separate entities, it may be possible for one or more of servers 210-220 to perform one or more of the functions of another one or more of servers 210-220. For example, it may be possible that two or more of servers 210-220 are implemented as a single server. It may also be possible for a single one of servers 210-220 to be implemented as two or more separate (and possibly distributed) devices.

Network 230 may include any type of network, such as a local area network (LAN), a wide area network (WAN), a telephone network (e.g., the Public Switched Telephone Network (PSTN) or a cellular network), an intranet, the Internet, or a combination of networks. Clients 205 and servers 210-220 may connect to network 230 via wired and/or wireless connections.

Exemplary Components of Client and/or Server

Figure 3:
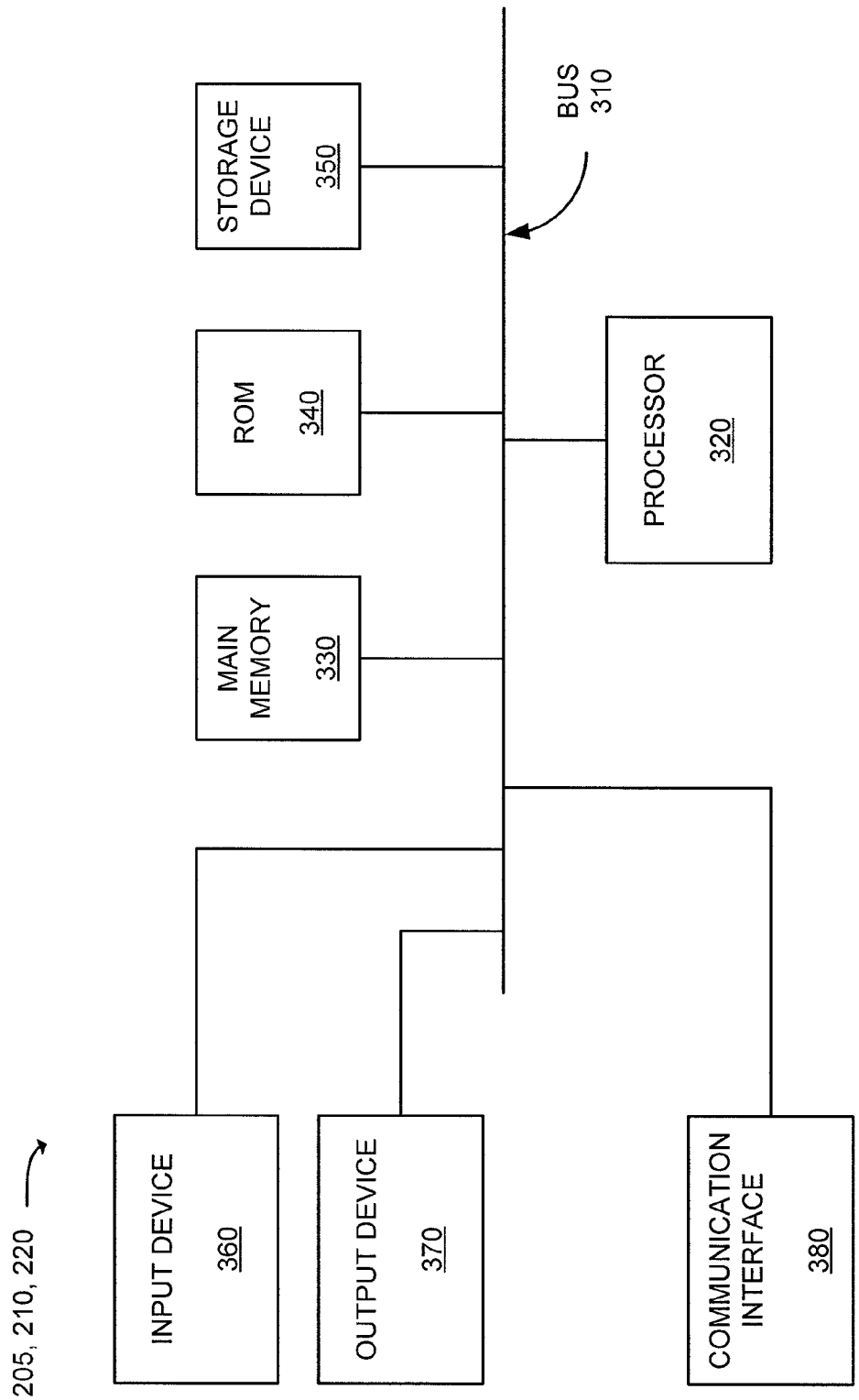
FIG. 3 is a diagram of exemplary components of a client or a server of FIG. 2.

FIG. 3 is a diagram of exemplary components of a client or server entity (hereinafter called "client/server entity"), which may correspond to one or more of clients 205 and/or servers 210-220. As shown in FIG. 3, the client/server entity may include a bus 310, a processor 320, a main memory 330, a read only memory (ROM) 340, a storage device 350, an input device 360, an output device 370, and a communication interface 380. In another implementation, client/server entity may include additional, fewer, different, or differently arranged components than are illustrated in FIG. 3.

Bus 310 may include a path that permits communication among the components of the client/server entity. Processor 320 may include a processor, a microprocessor, or processing logic (e.g., an application specific integrated circuit (ASIC) or a field programmable gate array (FPGA)) that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive, or a removable form of memory, such as a flash memory.

Input device 360 may include a mechanism that permits an operator to input information to the client/server entity, such as a keyboard, a mouse, a button, a pen, a touch screen, voice recognition and/or biometric mechanisms, etc. Output device 370 may include a mechanism that outputs information to the operator, including a display, a light emitting diode (LED), a speaker, etc. Communication interface 380 may include any transceiver-like mechanism that enables the client/server entity to communicate with other devices and/or systems. For example, communication interface 380 may include mechanisms for communicating with another device or system via a network, such as network 230.

As will be described in detail below, the client/server entity may perform certain operations relating to the generation and presentation of comments. The client/server entity may perform these operations in response to processor 320 executing software instructions contained in a computer-readable medium, such as memory 330. A computer-readable medium may be defined as a logical or physical memory device. A logical memory device may include a space within a single physical memory device or spread across multiple physical memory devices.

The software instructions may be read into memory 330 from another computer-readable medium, such as storage device 350, or from another device via communication interface 380. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Exemplary Server Functional Components

Figure 4:
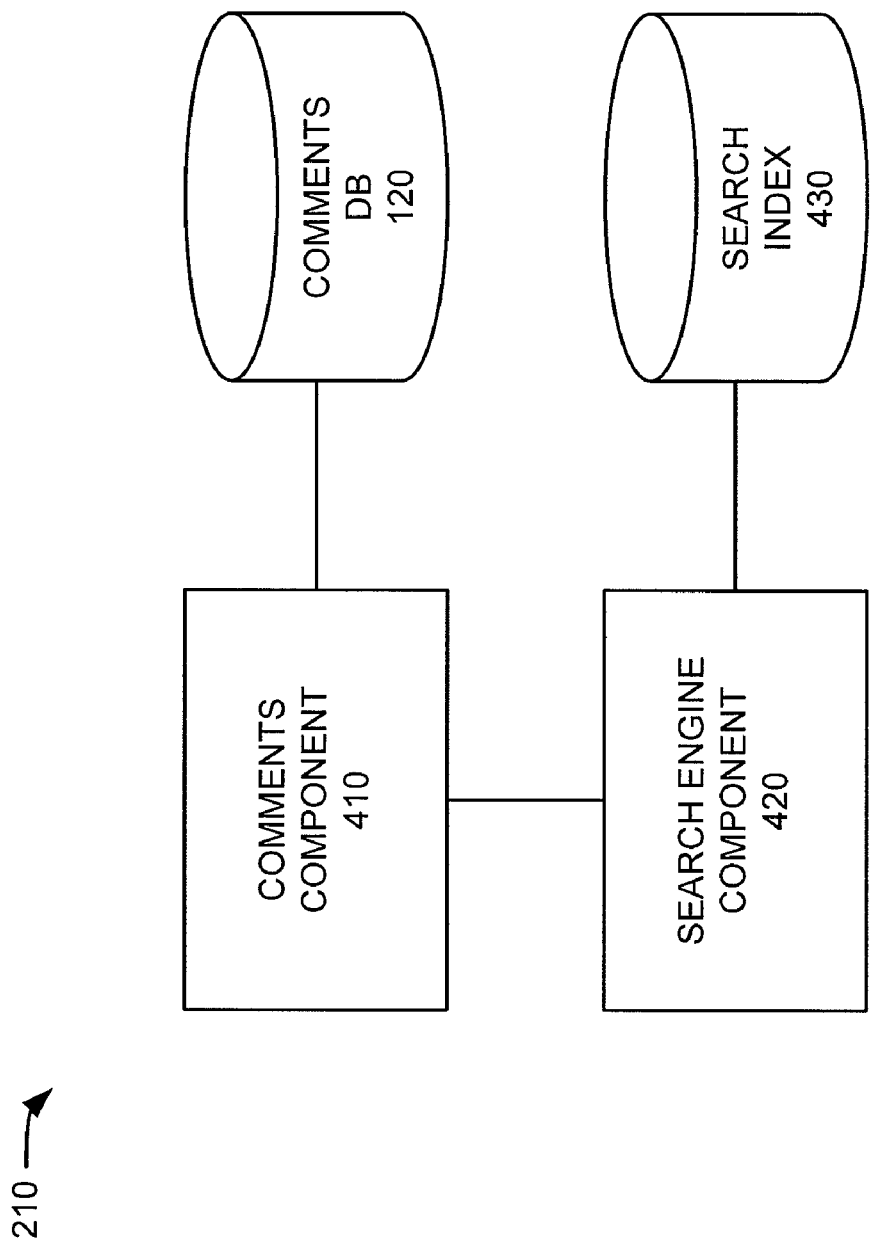
FIG. 4 is a diagram of functional components of a server of FIG. 2.

FIG. 4 is a diagram of exemplary functional components of server 210. As shown in FIG. 4, server 210 may include a comments component 410, comments database 120, a search engine component 420, and a search index 430. In another implementation, server 210 may include more or fewer functional components. For example, one or more of the functional components shown in FIG. 4 may be located in a device separate from server 210.

Comments component 410 may interact with clients 205 to obtain and/or serve comments. For example, a user of a client 205 may access a particular document and generate a comment regarding the document. Client 205 may send the comment and information regarding the document to comments component 410.

Comments component 410 may receive the comment provided by a client 205 in connection with the particular document. Comments component 410 may gather certain information regarding the comment, such as information regarding the author of the comment, a timestamp that indicates a date and/or time at which comment was created, the content of the comment, and/or an address (e.g., a uniform resource locator (URL)) associated with the document. Comments component 410 may receive at least some of this information from client 205. Comments component 410 may store the information regarding the comment in comments database 120.

Comments component 410 may also serve a comment in connection with a document accessed by a client 205. In one implementation, comments component 410 may obtain a comment from comments database 120 and provide that comment to client 205 when client 205 accesses a document with which that comment is associated in comments database 120, or when client 205 requests access to a link associated with comment (described in further detail below).

Comments database 120 may store information regarding comments. In one implementation, comments database 120 may include various fields that are separately searchable. Comments component 410 may search comments database 120 to identify comments associated with a particular author or a particular document.

Figure 5:
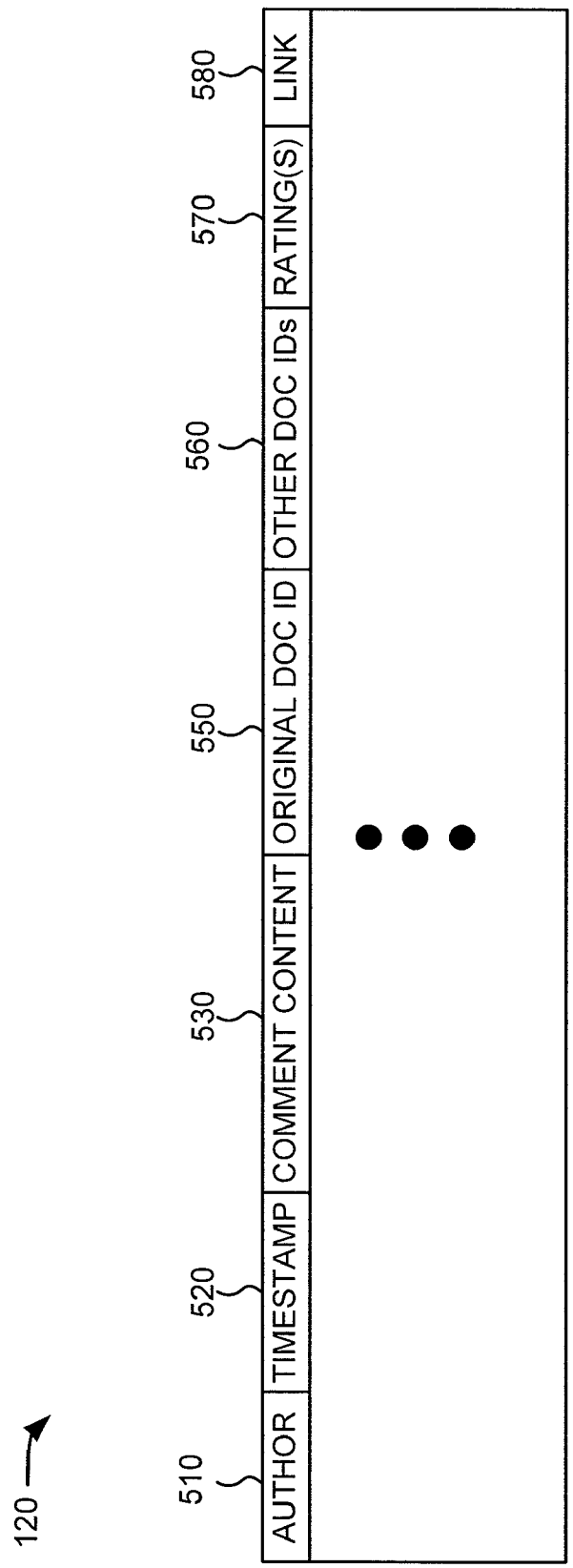
FIG. 5 is a diagram of exemplary fields that may be provided within the comments database of FIG. 4.

FIG. 5 is a diagram of exemplary fields that may be provided within comments database 120. As shown in FIG. 5, comments database 120 may include an author field 510, a timestamp field 520, a comment content field 530, an original document identifier field 550, an other document identifiers field 560, a rating(s) field 570, and a link field 580. In other implementations, comments database 120 may include more or fewer fields.

Author field 510 may store information regarding the author of the comment. For example, author field 510 may store the name of the author (e.g., actual name or online name), an image of the author, a graphic associated with the author, the name of a geographic location of the author, or other information regarding the author. Timestamp field 520 may store the date and/or time that the comment was created. The date/time for timestamp field 520 may be generated by client 205 at which the comment was created or may be generated by server 210 based on a date/time at which the comment is received from client 205.

Comment content field 530 may store the content of the comment. For example, the content of a comment may include text, video data, image data, and/or audio data. In one implementation, comment content field 530 may store the actual content of the comment. In another implementation, comment content field 530 may store a pointer to a storage location where the actual content of the comment is stored.

Original document identifier field 550 may store an identifier of the document for which the comment was originally created. For example, document identifier field 550 may store an address (e.g., a URL) of the document for which the comment was originally created. Other document identifiers field 560 may store document identifiers of one of or more other documents with which the comment has been associated. As will be described in detail below, a comment created regarding one document may be associated with other documents that have the same, or similar, content.

Rating(s) field 570 may store a rating for the comment. A rating may be based on user feedback regarding the comment. For example, users may be permitted to rate a comment (favorably or unfavorably). These ratings may be used to determine whether and/or how to present the comment in connection with a particular document or any document. In one implementation, a single rating may be maintained for a comment. That single rating may be used to determine whether and/or how to present the comment in connection with any document with which the comment has been associated. In another implementation, a separate rating may be maintained for each document (or for a group of documents) with which the comment has been associated. In this case, the rating, associated with a particular document, may be used to determine whether to present the comment with that particular document. Link 580 may store a link (e.g., a URL) that can be used to access corresponding comment content 530 via server 210. Upon receipt of a comment from a client 205, server 210 may generate a link to the comment and may supply that link to the client 205 (or another client) for accessing the comment content (described in further detail below with respect to FIGS. 6 and 9).

Returning to FIG. 4, search engine component 420 may receive the document from comments component 410 and locate other documents that include the same, or similar, content. When the document includes text, search engine component 420 may locate other documents that include the same, or similar, text. When the document includes image data, search engine component 420 may locate other documents that include the same, or similar, image data. When the document includes video data, search engine component 420 may locate other documents that include the same, or similar, video data. When the document includes audio data, search engine component 420 may located other documents that include the same, or similar, audio data.

Techniques exist for locating exactly matching text, image data, video data, and audio data. Search engine component 420 may use one of these techniques to locate a document with matching content. Techniques also exist for locating approximately matching text, image data, video data, and audio data. These techniques may determine a concept or topic associated with the document and locate another document relating to the same concept or topic. Alternatively, or additionally, these techniques may identify two documents as matching if at least a threshold amount of the two documents match. Alternatively, or additionally, these techniques may be based on synonyms.

Search engine component 420 may locate documents by searching search index 230. Search index database 230 may include one or more indexes. If search index 230 includes more than one index, search index 230 may store the indexes in the same data structure or in different data structures that may be searched independently of one another. Each of the one or more indexes may include multiple index entries, with each entry containing a term stored in association with an item, from a document, in which the term appears, and a location within the document where the term appears.

Creating a Comment

Figure 6:
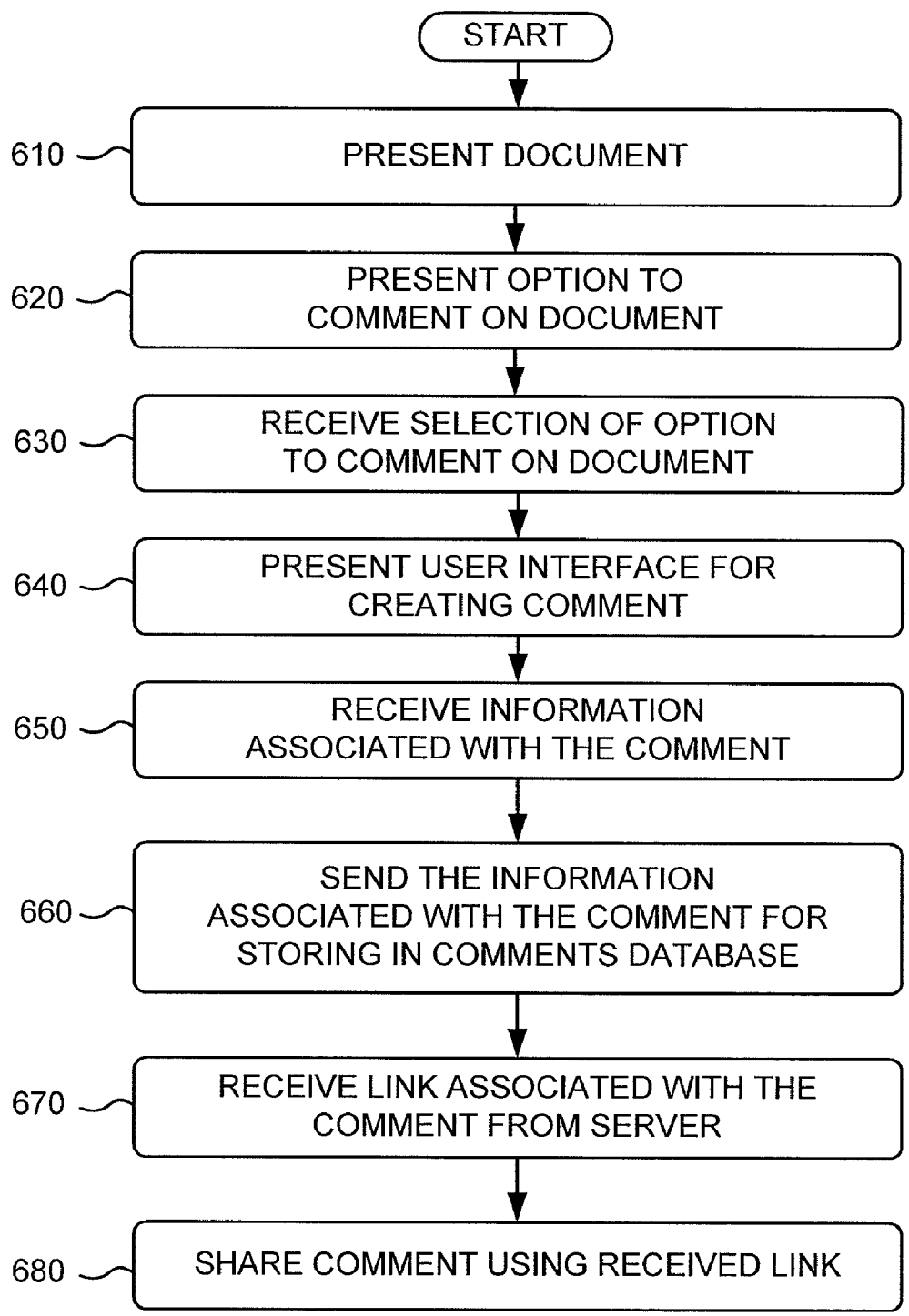
FIG. 6 is a flowchart of an exemplary process for creating a comment and receiving a link that is associated with the comment from a server.

FIG. 6 is a flowchart of an exemplary process for creating a comment. In one implementation, the process of FIG. 6 may be performed by one or more components within client 205, server 210, or a combination of client 205 and server 210. In another implementation, the process may be performed by one or more components within another device or a group of devices separate from or including client 205 and/or server 210. Also, while FIG. 6 shows blocks in a particular order, the actual order may differ. For example, some blocks may be performed in parallel or in a different order than shown in FIG. 6.

The process of FIG. 6 may include presenting a document to a user of client 205 (block 610). For example, the user may access the document via a browser application operating on client 205. To obtain access to the document, for example, the user might enter an address (e.g., a URL) into the address field of the browser, the user might select a document from a list of documents (e.g., a list of favorites or bookmarks), or the user might perform a search using a search engine and select a search result corresponding to the document.

An option to provide a comment regarding the document may be presented (block 620). For example, the browser may include a user interface item (e.g., a button, a menu item, etc.) that may permit the user to turn on and turn off the commenting function provided by the browser. The user may select this user interface item to create a comment, to view a comment, and/or to remove a presented comment from view (e.g., hide the comment from view).

Figure 7:
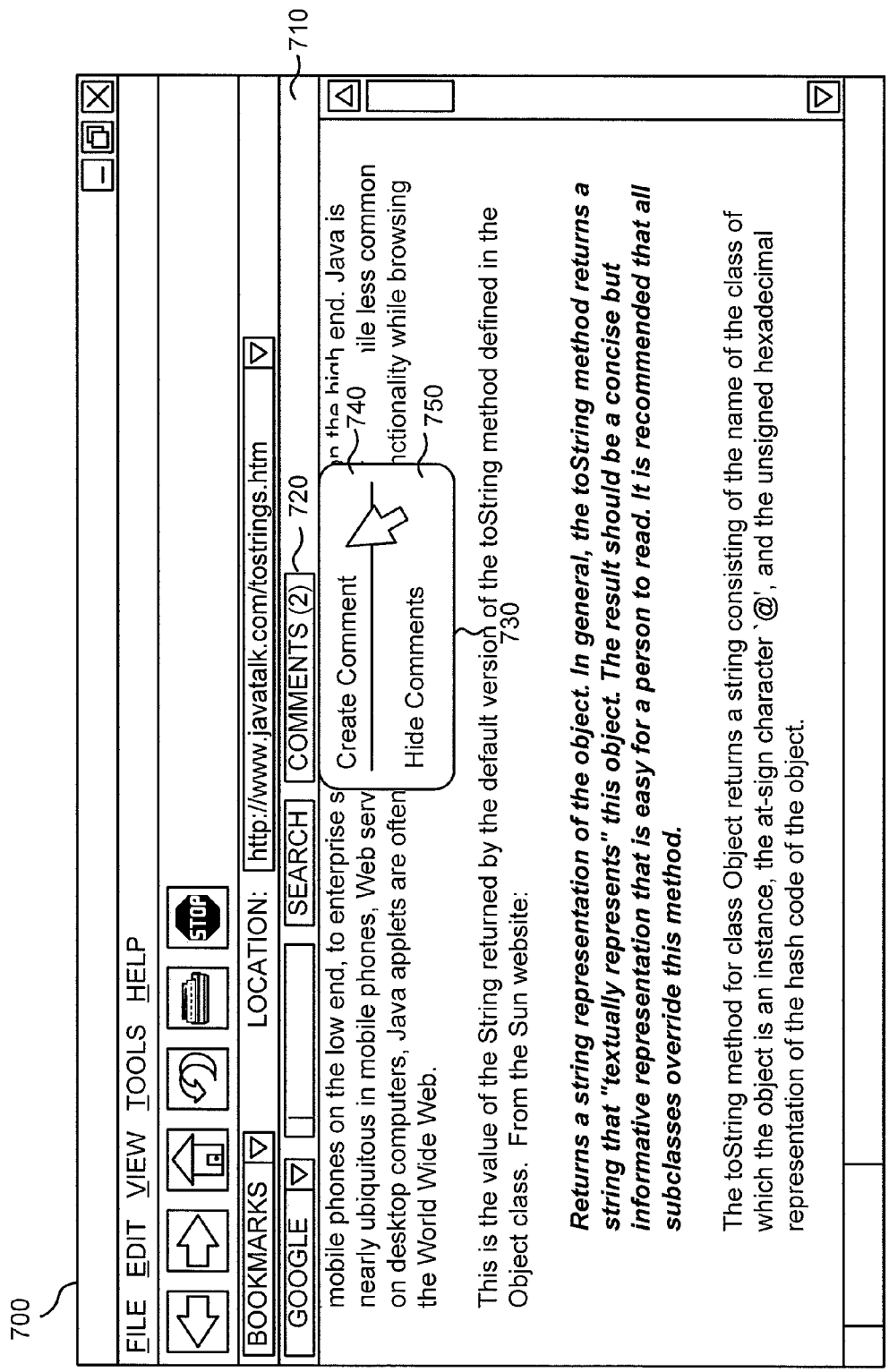
FIGS. 7 and 8 are diagrams of examples of creating a comment.

FIG. 7 is a diagram of an exemplary user interface that may be presented to a user to permit the user to activate the commenting function of the browser. As shown in FIG. 7, a browser window 700 may include an add-on toolbar 710 that includes a search box and a number of software buttons. In one implementation, toolbar 710 may include a comments button 720.

Comments button 820 may permit the user to turn on and off the commenting function. In one implementation, selection of comments button 720 may cause a menu 730 to be presented. Menu 730 may include a number of options including, for example, an option to create a comment 740, and an option to hide the comments 750. The user may select option 740 to generate a comment regarding the document that the user is currently accessing. The user may select option 750 to remove any presented comments from view (e.g., hide the comments from view).

Selection of the option to provide a comment regarding the document may be received (block 630). For example, the user might activate the commenting feature. In one implementation, the user might activate the commenting feature by selecting an item from a menu or by selecting a button on a toolbar. As shown in FIG. 7, for example, the user may select comments button 720 on toolbar 710 within browser window 700, and/or may select option 740 on menu 730.

A user interface may be presented to the user for creating the comment (block 640). For example, in response to receiving selection of comments button 720, the browser may present the user with a user interface via which the user may create a comment regarding the document. The information associated with the comment may be received (block 650). For example, the user may, via the user interface, input the content of the comment and/or insert a file as the content of the comment.

Figure 8:
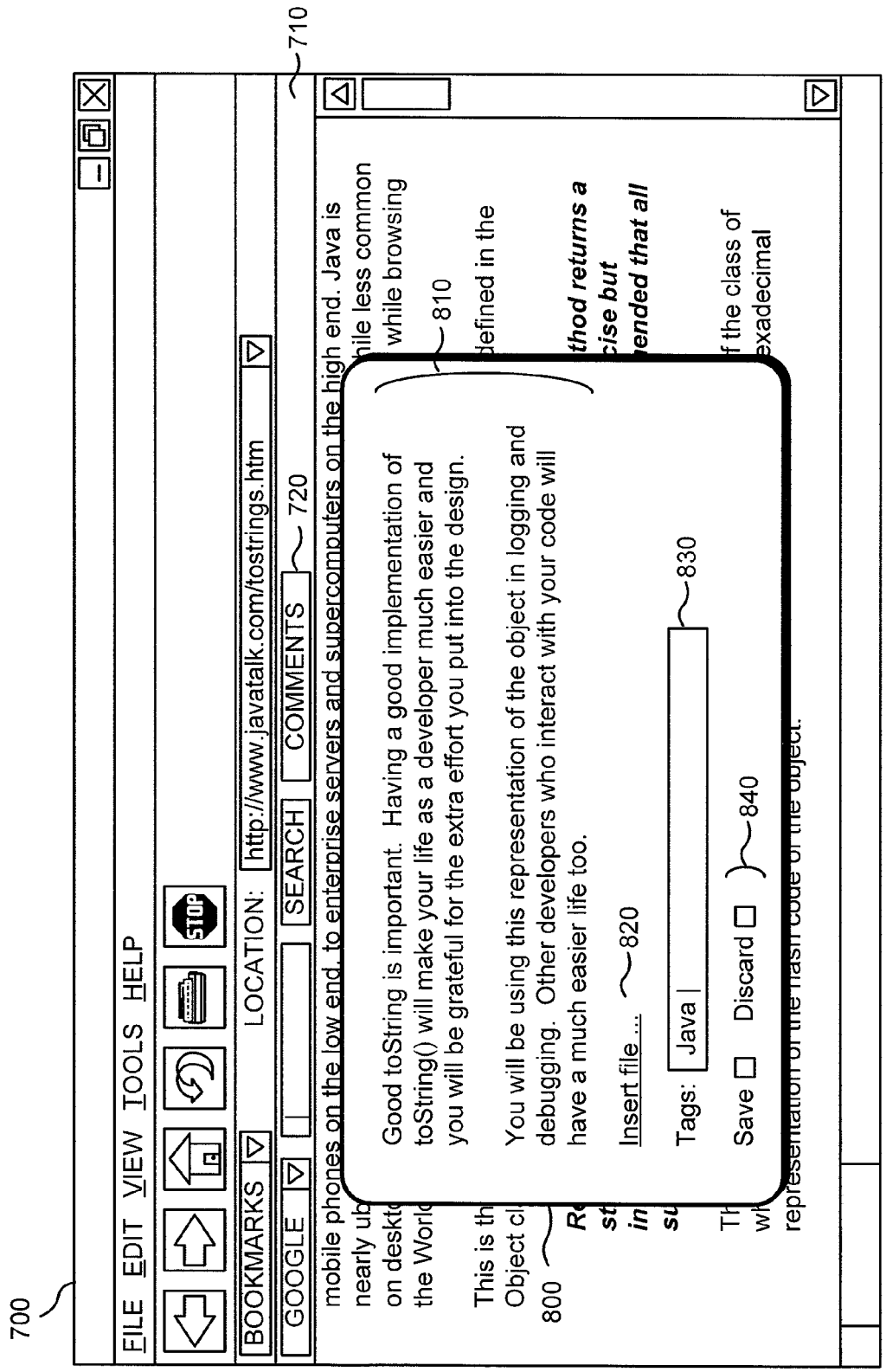

FIG. 8 is a diagram of an exemplary user interface that may be presented to a user to permit the user to create a comment. As shown in FIG. 8, browser window 700 may present a user interface 800 via which the user may enter the contents of the comment. User interface 800 may include input section 810, an option 820 to insert a file, a tags section 830, and save/discard options 840. Input section 810 may include an area into which the user may insert the contents of the comment (whether in the form of text, image data, video data, and/or audio data). Option 820 may permit the user to identify a file to be inserted into or attached to the comment. Tags section 830 may permit the user to identify keywords to associate with the comment. Save/discard options 840 may permit the user to select whether to save the comment or discard the comment without saving the comment.

Returning to FIG. 6, information associated with the comment may be sent for storing in comments database 120 (block 660). For example, the browser of client 205 may send information associated with the comment to comments component 410 of server 210. This information may include, for example, the name of the author of the comment (e.g., the user's name), a timestamp indicating the date and/or time that the comment was created, the content of the comment, and/or the document identifier (e.g., URL) of the originating document. Comments component 410 may create or update an entry in comments database 120 using this information. Comments component 410 may receive information associated with comments for multiple documents from multiple users and may, thus, populate comments database 120. Upon receipt of the information associated with the comment, server 210 may generate a link (e.g., a URL) at which the comment content may be stored for retrieval via network 230. Server 210 may store the generated link in link field 580. Server 210 may then return the generated link to client 205 from which the comment was received. The link associated with the comment may then be received by client 205 (block 670). Client 205 may subsequently share the comment using the received link (block 680). The link may be shared by, for example, including the link in an email (either manually or automatically generated), by posting the link on a website (e.g., Twitter, Facebook, etc.), by posting the link in a Blog (e.g., Blogger, etc.), or by sending the link via an Instant Message (IM). The link may also be available in a "profile" associated with a user of client 205 that generated the comment associated with the link. The "profile" may include information about the user that other users may access via server 210. The link may be shared via other mechanisms not described herein.

Presenting a Comment in Connection with a Document

Figure 9:
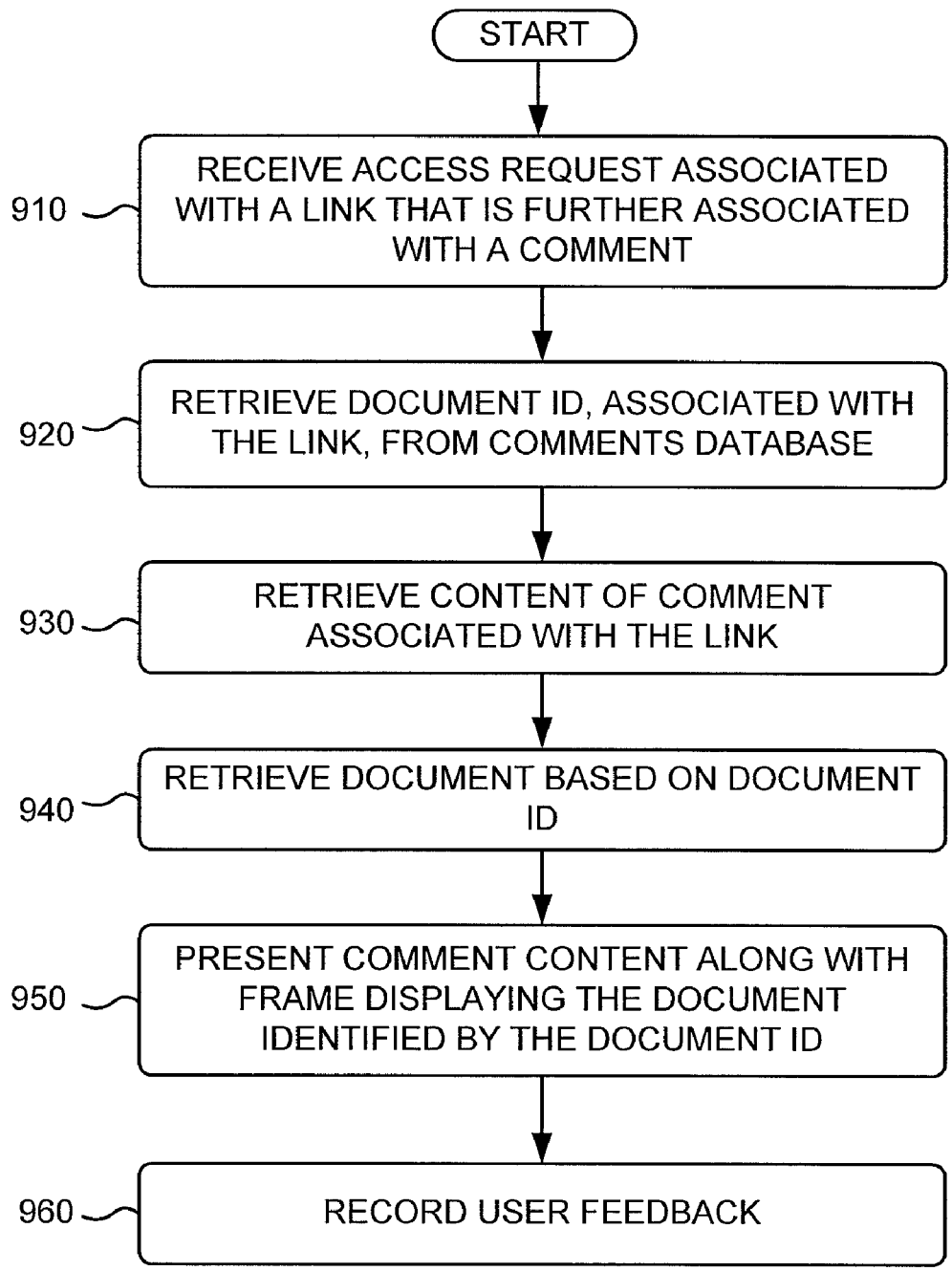
FIG. 9 is a flowchart of an exemplary process for presenting a comment in connection with a document.

FIG. 9 is a flowchart of an exemplary process for presenting a requested comment. In one implementation, the process of FIG. 9 may be performed by one or more components within client 205, server 210, or a combination of client 205 and server 210. In another implementation, the process may be performed by one or more components within another device or a group of devices separate from or including client 210 and/or server 210. Also, while FIG. 9 shows blocks in a particular order, the actual order may differ. For example, some blocks may be performed in parallel or in a different order than shown in FIG. 9.

The process of FIG. 9 may include receiving an access request associated with a link that is further associated with a comment (block 910). A client 205 may send an access request that includes an identification of the link that is associated with a comment (i.e., a link from block 670 of FIG. 6 above). Client 205 may include a client from which the comment originated, or another client with which the comment was shared. Upon receipt, server 210 may match the identified link with a corresponding link field 580 in comments database 120.

A document identifier, associated with the link, may be retrieved from comments database 120 (block 920). Server 210 may retrieve the document identifier from document identified field 550 of the database entry of comments database 120 that corresponds to the link field 580 identified in block 910. Thus, server 210 may index comments database 120 with the link to retrieve the document identifier from the corresponding document identifier field 550.

The content of the comment associated with the link may be retrieved from comments database 120 (block 930). Server 210 may retrieve the content of the comment from the comment content field 530 of the database entry of comments database 120 that corresponds to the link field 580 identified in block 910. Thus, server 210 may index comments database 120 with the link to retrieve the content of the comment from the corresponding comment content field 530.

A document may be retrieved based on the document identifier (block 940). Server 210 may use the document identifier to retrieve the content of the document, either from data server 220, or from local storage where the content of the document may be stored.

The retrieved comment content may be presented along with a frame that displays the document identified by the document identifier (block 950). Server 210 may generate a document that includes the comment content (e.g., displayed in the left portion of the document) and further includes the frame (e.g., to the right of the comment content displayed in the left portion of the document) which displays the content of the document retrieved from data server 220, or from local storage. In one exemplary implementation, the frame may include an HTML iframe.

Figure 10:
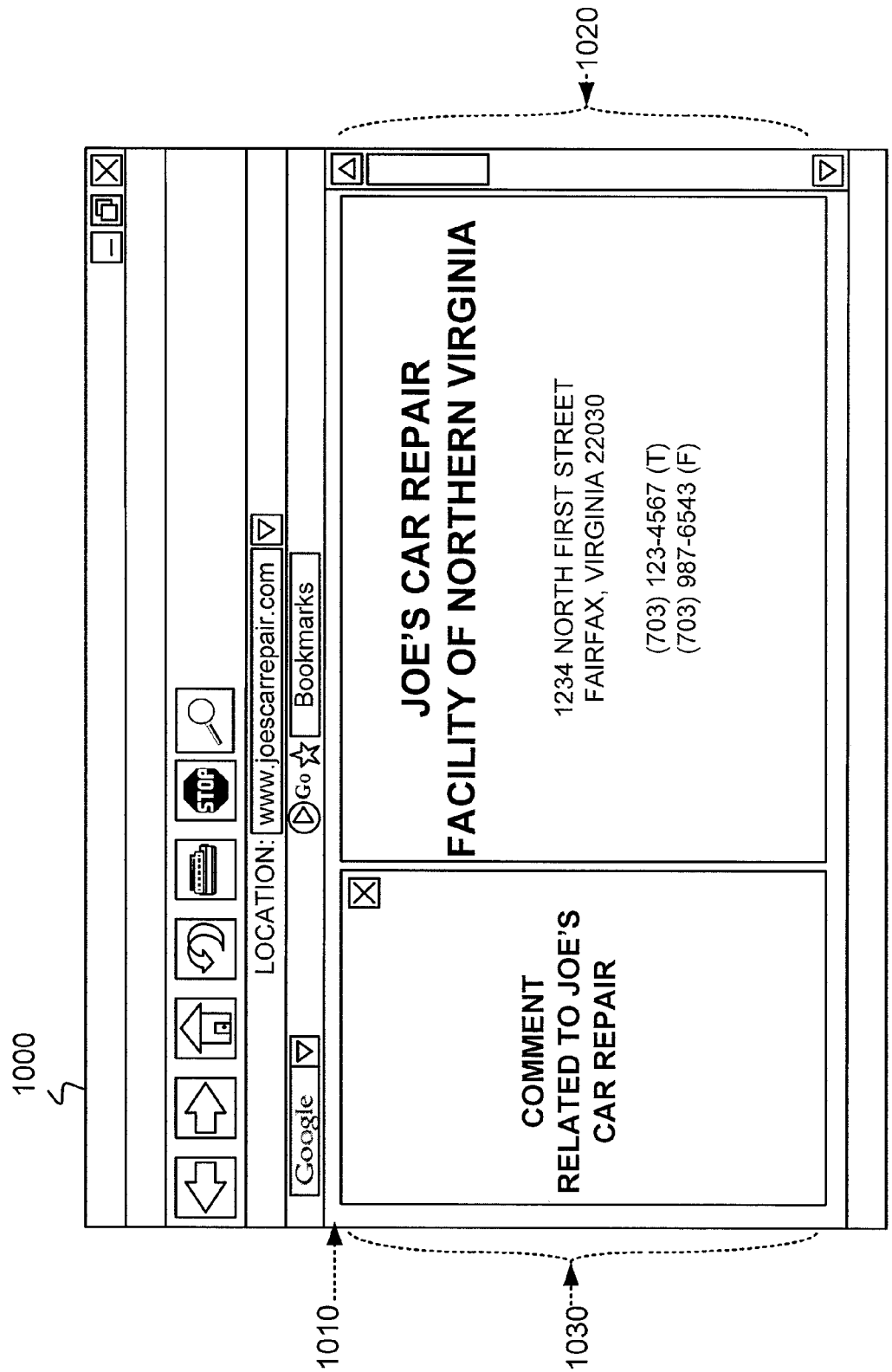
FIGS. 10-12 are diagrams of examples of presenting a comment.

FIG. 10 is a diagram of an exemplary user interface via which a comment may be presented. As shown in FIG. 10, a browser window 1000 may display a document 1010 that includes an iframe documents section 1020 and a comments section 1030. Documents section 1020 may include the content of a document, that is associated with a comment that a user requested via a link, inserted as an iframe within document 1010. Comments section 1030 may include the comment related to the document shown in documents section 1020. Server 210 may obtain the comment content, and insert the comment content in comments section 1030 of document 1010. Server 210 may further obtain the document that is associated with the comment and display the document within an iframe of documents section 1020.

Figure 11:
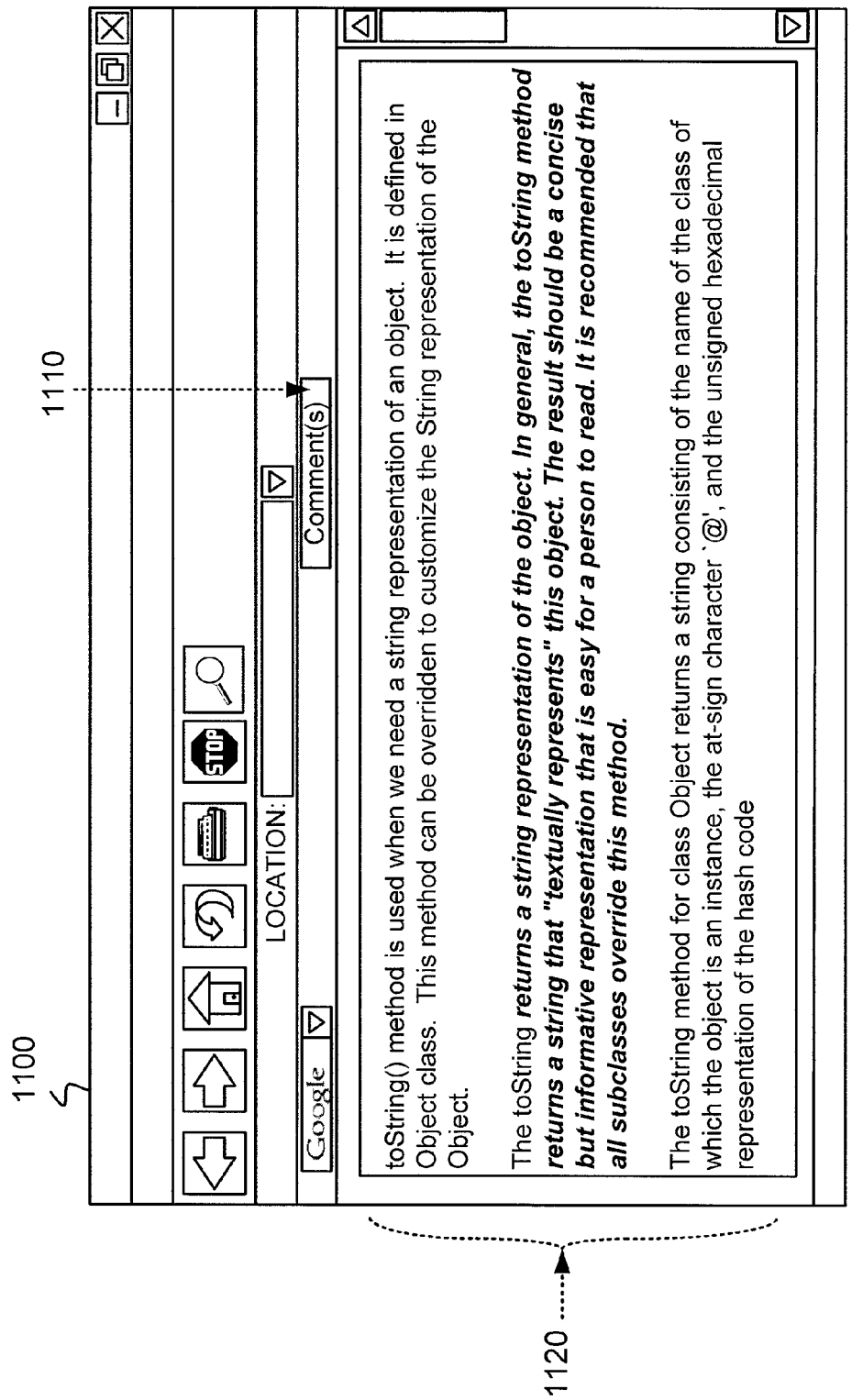

In one exemplary implementation, a bookmarklet may be used to show comments associated with a current document displayed in the browser window. The bookmarklet may be implemented as a "button" in the browser. A bookmarklet, as referred to herein, includes an applet (i.e., a small computer application) that performs a specific function. When the button is selected (e.g., clicked) in the browser, the bookmarklet may open a new browser window to display the comments associated with the current document. FIG. 11 depicts an exemplary embodiment in which a bookmarklet is implemented in a browser window 1100. As shown in FIG. 11, a "comment(s) button may be selected to cause a comments section to be displayed in conjunction with the current document, such as document 1120.

Figure 12:
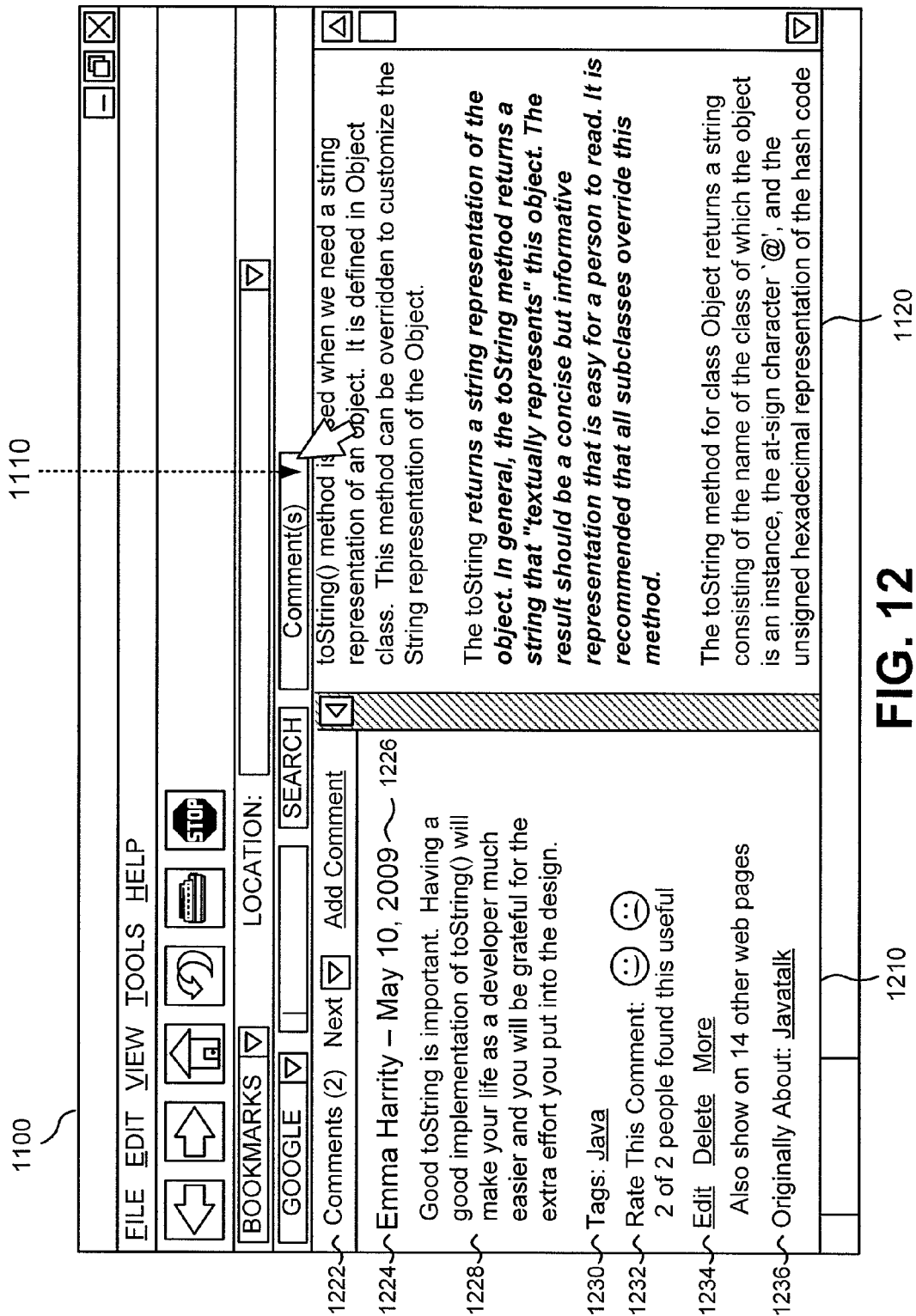

FIG. 12 is a diagram of an exemplary user interface, via which a comment may be presented, that depicts further exemplary details of a comments section 1210 displayed in association with document 1120 upon selection of "comment (s)" bookmarklet 1110. As shown in FIG. 12, comments section 1210 may include a header section 1222, an author name 1224, a timestamp 1226, a comment content 1228, tags 1230, rating option 1232, options 1234, and originating information 1236. Header section 1222 may include information regarding a quantity of comments that exist for this document, an option to see a next (or previous) comment, and/or an option to add a comment. Author name 1224 may include the name of the user that created the comment. Timestamp 1226 may include the date and/or time at which the comment was created. Comment content 1228 may include the content of the comment.

Tags 1230 may include keywords that may relate to a concept or topic of the comment or the document for which the comment was created. Rating option 1232 may present an option to the user to rate the comment (favorable or unfavorable rating). Rating option 1232 may also present information that indicates how many users found the comment useful (and/or not useful). Options 1234 may present options to the user to edit the comment, delete the comment, and/or obtain additional information regarding the comment. The additional information may include information regarding the other documents with which the comment is associated. Originating information 1236 may include information regarding the document for which the comment was originally created (i.e., the originating document). Originating information 1236 may also present a link to the originating document.

Returning to FIG. 9, any user feedback may be recorded (block 960). For example, if the user provides user feedback via rating option 1232, the browser may capture this feedback and provide the feedback to comments component 410. Comments component 410 may store the feedback in comments database 120. In one implementation, comments component 410 may combine the feedback with other feedback already received for the comment and this particular document, or for the comment and any document with which the comment has been associated.

CONCLUSION

Implementations, described herein, may enable users to comment upon the content of documents and may aggregate those comments in a database for documents across the Internet. When a user accesses a given document via a browser at a client, comments for the document may be retrieved from the database and provided for display via a browser. In an implementation in which a browser toolbar, browser extension or browser add-on is implemented at the client browser, the browser toolbar, extension of add-on may request comments from the server for a given document, may receive the requested comments from the server, and may display the comments in the browser in conjunction with the document. In an implementation in which a browser toolbar, browser extension or browser add-on is not implemented at the client browser, the browser may access a link associated with a comment and, in response, a server may generate a document that includes the content of the comment associated with the link, and further includes a HTML iframe that displays the document with which the comment is associated.

The foregoing description provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 6 and 9, the order of the blocks may be modified in other implementations. Further, non-dependent blocks may be performed in parallel.

Also, exemplary graphical user interfaces have been described with respect to FIGS. 7, 8 and 10-12. In other implementations, the graphical user interfaces may include more, fewer, or different pieces of information.

Also, certain portions of the implementations have been described as "logic" or a "component" that performs one or more functions. The terms "logic" or "component" may include hardware, such as a processor, an ASIC, or a FPGA, or a combination of hardware and software (e.g., software running on a general purpose processor—creating a specific purpose processor).

Further, it has been described that scores are generated for comments. The scoring scheme has been described where higher scores are better than lower scores. This need not be the case. In another implementation, the scoring scheme may be switched to one in which lower scores are better than higher scores.

Also, it has been described that users create comments regarding documents. In another implementation, comments may be created for portions of documents. A "document portion," as used herein, is intended to refer to less than the entire document. The document portion may include some amount of text (e.g., some number of words), an image, a video, or some audio.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, by a processor and from a first user, one or more comments related to a first document;
   identifying, by the processor, a second document that is not identical to the first document and includes at least a threshold amount of content from the first document;
   determining, by the processor, a document identifier associated with the second document;
   storing, by the processor, information that includes the one or more comments related to the first document and the document identifier associated with the second document, the stored information associating the one or more comments related to the first document and the document identifier associated with the second document;
   forming, by the processor and using the stored information, a web document that, when rendered, includes a first portion to present content associated with the second document and a second portion to present information associated with the one or more comments related to the first document, the first portion and the second portion being different; and
   enabling, by the processor, a second user to access the web document.

2. The method of claim 1, where enabling the second user to access the web document includes:
   forwarding a link to the web document to the second user, where forwarding the link includes:
      sending the link, via email, to the second user;
      posting the link on a website accessible to the second user;
      posting the link in a blog accessible to the second user; or
      sending the link via an instant message to the second user.

3. The method of claim 2, where the link comprises an address associated with a storage location of the stored information.

4. The method of claim 1, where the document identifier comprises an address associated with the second document.

5. The method of claim 1, further comprising:
   automatically determining a user identifier associated with the first user; and
   including, in the information, the determined user identifier.

6. The method of claim 1, further comprising:
   determining one or more timestamps associated with when the one or more comments are received; and
   including, in the information, the one or more timestamps.

7. The method of claim 1, further comprising:
   indexing the information,
   where enabling the second user to access the stored information includes:
      receiving a query from the second user,
      determining that at least one of the one or more comments or contents of the second document are relevant to the query, and
      providing the information as part of search results associated with the query.

8. A device, comprising:
   a memory; and
   one or more processors to:
      receive a comment related to a first document,
      identify a plurality of second documents, each of the plurality of second documents being not identical to the first document and including at least a threshold amount of content from the first document,
      determine information associated with the plurality of second documents,
      store, in the memory, the comment related to the first document and the information associated with the plurality of second documents, and
      enable another device to access the stored comment related to the first document and the stored information associated with the plurality of second documents,
   the processor, when enabling the other device to access the stored comment related to the first document and the stored information associated with the plurality of second documents, being further to:
      generate, based on the stored information, a web document that, when rendered, includes a first portion to present information associated with the stored comment related to the first document and a second portion to present content associated with one of the plurality of second documents, the first portion and the second portion being different, and
      provide the other device with access to the generated web document.

9. The device of claim 8, where the processor, when enabling the other device to access the stored comment related to the first document and the stored information associated with the plurality of second documents, is further to:
   send, to the other device, an address associated with a network location associated with at least one of the stored comment related to the first document or the stored information associated with the plurality of second documents.

10. The device of claim 8, where the information associated with the plurality of second documents includes respective identifiers of the plurality of second documents.

11. The device of claim 10, where each of the identifiers comprises a uniform resource locator (URL) associated with a corresponding one of the plurality of second documents.

12. The device of claim 8, where the processor is further to:
   determine an identifier associated with a user of the device, and
   modify the comment related to the first document to include the identifier.

13. The device of claim 8, where the processor, when enabling the other device to access the stored comment related to the first document and the stored information associated with the plurality of second documents, is further to:
   index at least one of the comment related to the first document or the information associated with the plurality of second documents,
   receive a query from the other device,
   determine that the indexed at least one of the comment related to the first document or the information associated with the plurality of second documents is relevant to the query, and
   identify the indexed at least one of the comment related to the first document and the information associated with the plurality of second documents as part of search results associated with the query.

14. A non-transitory memory device storing:
   one or more instructions which, when executed by one or more processors, cause the one or more processors to:
      receive, from a first user, one or more comments related to a first document;

one or more instructions which, when executed by the one or more processors, cause the one or more processors to identify a second document that is not identical to the first document and includes at least a threshold amount of content from the first document;

one or more instructions which, when executed by the one or more processors, cause the one or more processors to determine a document identifier associated with the second document;

one or more instructions which, when executed by the one or more processors, cause the one or more processors to store information that includes the one or more comments related to the first document and the document identifier associated with the second document;

one or more instructions which, when executed by the one or more processors, cause the one or more processors to associate the one or more comments related to the first document with the document identifier associated with the second document;

one or more instructions which, when executed by the one or more processors, cause the one or more processors to form a web document that, when rendered, includes a first portion and a second portion being different, the first portion comprising content associated with the second document and the second portion comprising the one or more comments related to the first document; and one or more instructions which, when executed by the one or more processors, cause the one or more processors to enable a second user to access the web document.

15. The non-transitory memory device of claim 14, where the one or more instructions to enable the second user to access the web document include:

one or more instructions to forward a link to the web document to the second user, where the one or more instructions to forward the link include:

one or more instructions to send the link, via email, to the second user;

one or more instructions to post the link on a website accessible to the second user;

one or more instructions to post the link in a blog accessible to the second user; or one or more instructions to send the link via an instant message to the second user.

16. The non-transitory memory device of claim 15, where the link comprises a network address associated with a storage location of the stored information.

17. The non-transitory memory device of claim 14, where the document identifier comprises a network address associated with the second document.

18. The non-transitory memory device of claim 14, further storing:

one or more instructions to automatically determine a user identifier associated with the first user; and one or more instructions to include, in the stored information, the determined user identifier.

19. The non-transitory memory device of claim 14, further storing:

one or more instructions to determine one or more timestamps associated with when the one or more comments related to the first document are received; and one or more instructions to include, in the stored information, the one or more timestamps.

20. The non-transitory memory device of claim 14, further storing:

one or more instructions to index the information, where the one or more instructions to enable the second user to access the web document include:

one or more instructions to receive a query from the second user, one or more instructions to determine that at least one of the comments related to the first document or the content associated with the second document are responsive to the query, and one or more instructions to provide information associated with the web document in a search result associated with the query.

* * * * *